United States Patent Office 3,309,658
Patented Mar. 14, 1967

3,309,658
AMPLITUDE LOGGING ON ALTERNATE TRANSMITTER PULSES
Gerald C. Summers, Dallas, Tex., assignor to Mobil Oil Corporation, a corporation of New York
Application May 15, 1964, Ser. No. 367,661, now Patent No. 3,260,993, dated July 12, 1966, which is a division of application Ser. No. 287,853, May 15, 1952, now Patent No. 3,191,145, dated June 22, 1965. Divided and this application Apr. 18, 1966, Ser. No. 543,341
6 Claims. (Cl. 340—18)

This is a division of application Ser. No. 367,661, May 15, 1964, now U.S. Patent No. 3,260,993, which, in turn, is a division of application Ser. No. 287,853 May 15, 1952, now U.S. Patent 3,191,145. This invention relates to well logging and, more particularly, to the production and transmission of more than one set of borehole data without objectionable crossfeed effects. The invention has been found to be particularly applicable to acoustic well logging and, for the purpose of illustration, reference will be made to such systems.

For example, knowledge of acoustic velocity of formations is important from the standpoint of both exploration for and production from petroleum reservoirs. In applicant's Patent No. 2,704,364, which issued Mar. 15, 1955, there is disclosed a system in which an output voltage is produced dependent upon the travel time of an acoustic pulse between a transmitter and a receiver spaced a predetermined distance apart and movable one with the other in their predetermined spaced relation throughout the length of a borehole. In accordance with the aforesaid patent, there is produced a single log or curve of velocity versus depth. In accordance with the present invention, a plurality of traces are produced or, in the alternative, a single trace is produced utilizing two independent sets of velocity data giving more detailed and reliable information relating to the formations along the borehole. In the interest of accuracy in velocity measurements, sharp, discrete energy pulses are used. Transmission of such pulses over the length of extremely long cables used to extend to the bottom of deep boreholes presents a problem of isolation or separation of the signals. Where arrival times of pulses at the surface and the timing and detection thereof are critical, crossfeed difficulties as between adjacent cable channels may render entirely inoperative systems attempting to utilize separate channels.

A similar problem exists in systems responsive to variations in the attenuation properties of formations. In Patent No. 2,691,422, whch issued Oct. 12, 1954, to applicant and Robert A. Broding, a system is disclosed for producing a single output voltage proportional to the energy transmitted between two points over a selected formation path. In accordance with the present invention, two output voltages may be produced and utilized for more accurately defining the attenuation properties of the formation.

In accordance with the present invention, pulses spaced in time are transmitted over the same channel for avoidance of signal crossfeed with suitable coding means for proper separation of the time-spaced signals at the earth's surface. Thus, the difficulties generally encountered are completely eliminated permitting the utilization of two independent sets of data transmitted over a single channel. While, in general, multiple transmission is not new, limitations on borehole instrumentation and the desirability of simplicity in downhole components present problems not ordnarily present in multiplexing problems.

By the present invention, there is provided a borehole sensing system which comprises means for periodically generating a transient condition in formations adjacent to the borehole with detectors separated one from another at points spaced from the generating means. A signal channel extending along the borehole is alternately connected first to one and then to the other of the detectors in response to generation of each cycle of the transient condition for transmission of time-separated signals dependent upon the condition detected at two points in the borehole. A time marker is transmitted through the borehole having a predetermined time relation to the generation of each cycle of the condition with means for distinctively characterizing the timing marker when the first of the detectors is connected to the signal channel different from when the second of the detectors is connected to the signal channel.

In a further aspect of the invention, two sensing units at the earth's surface are coupled to the transmission channel for reception of the time-separated signals and are controlled by means responsive to the timing marker for coupling first one and then the other of the sensing means on alternate cycles of the condition to the signal channel for producing two outputs respectively representative of the condition at two points in the borehole. Means responsive to the outputs of the sensing means may be utilized to produce one or more distinctive logs.

Further, applicant produces a first log dependent upon the travel time of an acoustic pulse over a relatively long path or a log of one of the aforementioned outputs; and also produces a second log, the difference between the aforementioned outputs, to present a more detailed velocity picture of the formations.

For further objects of the present invention and for a more complete understanding thereof, reference may now be had to the following description taken in conjunction with the accompanying drawings in which.

Figure 1:
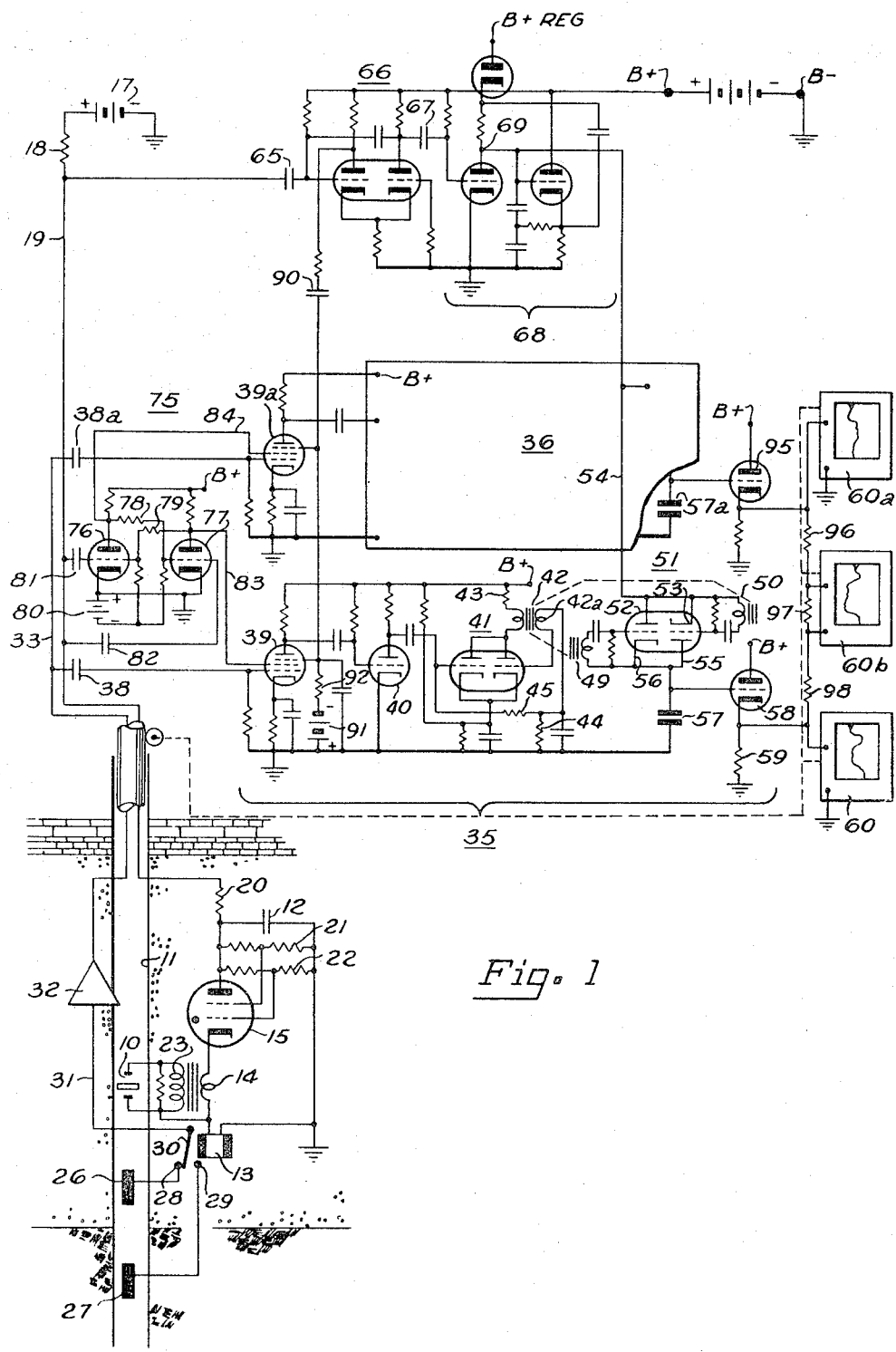
FIG. 1 is a schematic circuit diagram of one form of the present invention.

Referring now to FIG. 1, an acoustic velocity well logging system is illustrated in which an acoustic pulse transducer means, including a crystal element 10, is located at depth in a borehole 11. In the interest of clarity, the housing for the elements comprising the downhole instrument operating in borehole 11 has been omitted and the circuit has been illustrated in detail at points representative of their operative positions in the borehole. The crystal 10 is excited by way of an electrical pulse produced upon discharge of a condenser 12. The discharge circuit of condenser 12 includes the cathode-anode impedance of a gas discharge tube 15, a primary winding 14 of a pulse transformer, and a relay coil 13. The condenser 12, the pulse transformer and the gas discharge tube 15, together with the crystal 10, comprise a pulse producing transducer means. Condenser 12 may be charged from a direct current source 17 positioned at the surface of the earth and having its negative terminal connected to ground. The positive terminal is connected by way of resistance 18, cable conductor 19 and resistance 20 to condenser 12 and to the anode of tube 15. Tube 15 of the tetrode type has its grids connected to points of positive potential on the voltage dividing resistors 21 and 22.

The voltage on the condenser 12 builds up gradually as current flows through resistors 18 and 20 until the voltage across it is sufficient to fire tube 15. Condenser 12 abruptly discharges through tube 15 producing a pulse in the primary 14 of the pulse transformer. The secondary 23 of the pulse transformer is connected directly to the terminals of the crystal 10. The crystal 10, suitably supported in the borehole, produces pressure variations in the adjacent formations.

The resultant acoustic pulse from the free-running transducer means is detected at two points spaced one from another and from the crystal 10. More particularly, detectors 26 and 27, supported in fixed relation to crystal 10, are positioned in the borehole and are connected to terminals 28 and 29 of an output circuit selector which, in the form illustrated, is a relay mechanism actuated by energization of coil 13. The armature 30 of the relay is connected by way of conductor 31 to a borehole amplifier 32 whose output, in turn, is connected to the signal channel 33 extending from within the borehole to the earth's surface.

Relay operation is such that armature 30 is restrained (by means not shown) in contact with terminal 28 until energization of coil 13. Thereupon, armature 30 is moved into contact with terminal 29 and is there restrained until a subsequent energization of coil 13. Stepping switches operating in this manner are commercially available.

The relay first connects detector 26 to amplifier 32 for a first cycle of the pulse generated by crystal 10 and then, on the next cycle, connects detector 27 to amplifier 32. On the following cycle, detector 26 is again connected to the amplifier 32. Thus the signal channel 33 carries signals on successive cycles that are dependent upon the acoustic pulse as detected at two different points. The relay coil 13, energized upon each discharge of condenser 12, provides a simple but reliable means for separating the effects produced by the two detectors.

In order to utilize the alternate signals appearing on the signal channel 33, there is provided at the earth's surface a pair of sensing systems 35 and 36. The sensing systems 35 and 36 are substantially identical in construction and for that reason only one has been shown in detail. Where differences are necessary for utilization of the time-separated signals appearing on channel 33, such differences have been shown.

Consider first the sensing system 35. The construction and operation of this sensing system have been described in detail in the aforementioned Patent No. 2,704,364. Briefly, however, the signals appearing on channel 33 are applied by way of condenser 38 to the input grid of a pentode amplifier 39. The output of amplifier tube 39 is applied to amplifier tube 40 whose output, in turn, actuates a blocking oscillator 41. The blocking oscillator 41 comprises a pair of triode sections parallel-connected at both cathode and anode with the signal from tube 40 applied to the grid of one of the sections. The anodes are connected through the primary of a pulse transformer 42 and a resistor 43 to a source of anode potential. A first secondary 42a of the transformer 42 is connected to the grid of the second of the triode sections and by way of resistor-condenser combination 44 to ground. When a voltage train having an abrupt onset is applied to the input grid of the blocking oscillator 41, a single pulse is generated in the output which produces a voltage in the RC network 44. This voltage, coupled by way of resistor 45 to the input grid, blocks the circuit for a period depending upon the time constant of the network 44. As a result, a single pulse is produced coincident with the onset of the voltage train.

The pulse output of the blocking oscillator 41 also appears in a second secondary winding 49 and a third secondary winding 50. For convenience in illustrating the circuit, the dotted lines have been placed between the cores associated with windings 42a, 49 and 50 and are to be taken as indicating a common magnetic core.

The secondary windings 49 and 50 are connected in and serve to actuate a normally closed electronic switch 51. The electronic switch 51 includes a pair of triodes connected as to permit conduction bilaterally. More particularly, anode 52 is connected to cathode 53 and also to a conductor 54 connected to a time varying source voltage, the nature of which will hereinafter be described. Anode 55 is connected to cathode 56 and also to one terminal of a condenser 57. The other terminal of condenser 57 is connected to ground. Condenser 57, by the momentary energization of the transformer secondaries 49 and 50 which opens the normally closed switch 51, is charged to a voltage equal to the voltage appearing on conductor 54. The voltage on condenser 57 is then sensed by a cathode follower output stage 58.

The voltage across the cathode resistor 59 may be utilized to actuate a suitable recorder 60 to produce a record trace which varies in proportion to the voltage across condenser 57.

The voltage on conductor 54 preferably varies monotonically and linearly in time beginning at zero coincident with the generation of each acoustic pulse by the crystal 10 so that the voltage across the condenser 57 or 57a will be maintained at all times directly proportional to the time required for an acoustic pulse to travel from crystal 10 to one of the two associated detectors. When the condenser 12 discharges through tube 15, a voltage pulse appears on the borehole conductor 19. This pulse is applied by way of condenser 65 to the input grid of a monostable multivibrator 66. The pulse output of the monostable multivibrator 66 is transmitted through condenser 67 to a voltage generator 68. The voltage generator 68, together with its controlling multivibrator 66, is of the type well known in the art and is illustrated and described in detail in Waveforms, vol. 19, of the M.I.T. Radiation Laboratories Series, McGraw-Hill, 1949, at Section 5.5, page 166. The operation is such that the voltage at point 69 is initially zero and rises monotonically and linearly as a function of time thereafter. This voltage, applied by way of conductor 54 and through the switch 51, when opened by the pulses coincident with transmission of a signal through amplifiers 39 and 40, charges the condenser 57. The voltage stored on condenser 57 is thus proportional to the time interval between generation of the pulse by crystal 10 and the arrival at detector 26 or 27 of the acoustic pulse.

In operation of the system of FIG. 1, the sensing means 35 is responsive only to pulses from detector 26 or only to pulses from detector 27. Similarly, for any one period of operation or for any one logging run, the sensing system 36 is responsive only to detector 27 or to detector 26. By this means, there will be produced across condenser 57 a voltage dependent upon the travel time of a pulse from crystal 10 to, for example, detector 26. There will also be stored by or produced across condenser 57a, at the output of sensing system 36, a voltage dependent upon the travel time of an acoustic pulse from crystal 10 to detector 27.

Uncertainty as to which detector energizes which sensing system is permitted in FIG. 1, as further explained below. More particularly, no means is provided to make certain that detector 26 will actuate sensing system 35 for every series of operations. Just which sensing system the individual detectors actuate will depend upon the condition of the control circuit 75 at the beginning of each logging run or each series of operations. In this form of the invention, no attempt is made to control the initial condition, which is random, but, nevertheless, the voltages on condensers 57 and 57a are properly utilizable for the production of borehole logs regardless of the random nature of initial channel selection.

More particularly, the control circuit 75 is a bistable multivibrator and includes tubes 76 and 77. The anodes are connected through suitable load resistors to a source of anode potential (B+). The cathodes are connected directly to ground. The control grids are conventionally cross-connected to the anodes by way of resistors 78 and 79. The grids are also connected through bias battery 80 to ground. The timing marker on borehole conductor 19 is applied to both grids by way of condensers 81 and 82. The anode of tube 77 is connected by way of conductor 83 to the screen grid of amplifier 39. The anode of tube 76 is connected by way of conductor 84 to the screen grid of tube 39a which is the input amplifying pentode of the sensing unit 36.

When tube 77 is conducting, the voltage at its anode is relatively low with respect to ground, and thus the screen voltage on tube 39 is relatively low so that there will be no conduction therethrough. Tube 39 is thus effectively blocked, i.e., biased to cut-off, when tube 77 is conducting. At the same time, the anode of tube 76 is relatively high so that tube 39a is conducting and thus passes signals applied to its control grid from channel 33 by way of condenser 38a.

In order to illustrate operation of this system, assume tube 76 is initially non-conducting and tube 77 initially conducting. The following conditions or actions take place in substantially the following order:

(1) A sonic pulse is generated by crystal 10.

(2) Relay coil 13 is energized to move armature 30 to terminal 29 connecting detector 27 to the amplifier 32.

(3) A timing marker appearing on conductor 19 actuates monostable multivibrator 66 and voltage generator 68 to initiate generation of a linearly rising voltage at point 69.

(4) The timing marker is applied to the grids of both tubes 76 and 77 through condensers 81 and 82, respectively. If it is a positive pulse, it initiates conduction in tube 76 which simultaneously stops conduction in tube 77. If a negative pulse, it is effective on the grid of tube 77 to extinguish tube 77 and to initiate conduction in tube 76. As a result, tube 39a is rendered non-conductive and tube 39 is rendered conductive.

(5) Detector 27 produces an electrical pulse in response to the received sound pulse which is transmitted to the surface on channel 33 and thence through condenser 38 to the sensing unit 35.

(6) The blocking oscillator 41 momentarily opens switch 51 coincident with and responsive to the electrical pulse from condenser 38 thereby to charge condenser 57 to the voltage at that instant appearing between point 69 and ground. Switch 51 is immediately closed so that the charge on and thus the voltage across condenser 57 remains constant until switch 51 is again opened.

(7) Condenser 12, having accumulated a charge and thus a voltage sufficient to cause breakdown of tube 15, again discharges generating a second sonic pulse at crystal 10.

(8) Relay coil 13 is energized to move armature 30 to terminal 28 connecting detector 26 to amplifier 32.

(9) A timing marker generated coincident with discharge of condenser 12 initiates another cycle of generation of a linearly varying voltage at point 69, the monostable multivibrator 66 and the voltage generator 68 having reset themselves automatically in dependence upon their own time constants.

(10) The timing markers applied to tubes 76 and 77 extinguish tube 76 and initiate conduction in tube 77, thus rendering tube 39a conductive and tube 39 non-conductive.

(11) Detector 26 generates an electrical voltage coincident with the arrival of the acoustic pulse which is amplified by amplifier 32 and transmitted uphole over conductor 33. This pulse is applied through condenser 38a to amplifier tube 39a and thence through the sensing unit 36 to charge condenser 57a to a voltage proportional to the time of travel of the acoustic pulse between crystal 10 and detector 26.

Thereafter the foregoing steps are repeated cyclically so that detectors 26 and 27 alternately are connected to amplifier 32 and channel 33, and sensing systems 35 and 36 are synchronously and alternately rendered conductive by the signals thus generated.

Incidentally, and as explained in detail in the above mentioned Patent 2,704,364, a voltage from the monostable multivibrator 66 is connected by way of resistor-condenser combination 90 to the suppressor grids of both tubes 39 and 39a. This voltage, operating in conjunction with the battery 91 and its associated resistor and condenser circuit 92, renders non-conductive tubes 39 and 39a simultaneously with the transmission of the timing marker to prevent the timing marker itself from energizing the switch 51 and the corresponding switch in the sensing unit 36. The voltage on the suppressors of tubes 39 and 39a thereafter gradually rises so that insofar as the suppressor grid is concerned, both tubes 39 and 39a may conduct shortly after appearance of the timing marker pulse.

It will now be apparent that two output voltages are produced (i.e., across condensers 57 and 57a). They may be utilized to produce any or all of three useful velocity type logs. Recorder 60 records as a first log the voltage across condenser 57. The voltage across condenser 57a through cathode follower stage 95 is applied to a recorder 60a to produce a second log. Additionally, the cathode of tube 95 is connected by way of resistors 96, 97 and 98 to the cathode of tube 58. Any differences in voltage across condensers 57 and 57a will thus appear, in a predetermined scaled relation which depends on the magnitudes of resistors 96–98, across the central resistor 97. A third recorder 60b is connected to record as a third log the voltage across resistor 97.

Thus, regardless of the initial condition of the control unit 75, recorder 60b will indicate in reliable relationship the differences in magnitude between the voltage of condensers 57 and 57a. Since one detector in general is positioned closer to the crystal 10 than the other detector, the larger of two voltages as indicated by the amplitudes of traces on recorders 60 and 60a will indicate which channel is sensing the near detector or the far detector.

This system may be utilized to particular advantage by recording two functions only, a first of which is a voltage proportional to the travel time over a long path (the path between crystal 10 and the far detector 27). This will give a relatively accurate measure of the velocity. For a detailed velocity study, detector 26 may be positioned closely adjacent detector 27, and the difference in the pulse travel times for the two distances, as recorded by recorder 60b, will indicate velocity detail far beyond the perception of conventional velocity logging systems.

The signals for providing such data are transmitted to the earth's surface without the possibility of crossfeed, the separation of signals being provided by relatively simple selector means in the borehole requiring no components other than the relay itself. If attempts are made to utilize separate channels without the signal selective network such as is here provided for the surface units, crossfeed will render the system inoperative. Transmission of such signals over 6,000 to 10,000 feet of cable, with cables of the type available in the industry, often has crossfeed signals of magnitudes in the order of 33 percent or more, depending, of course, upon the frequency spectrum of the signals transmitted. Such objectionable features are thus overcome, permitting use of conventional well logging cables.

Figures 2, 3:
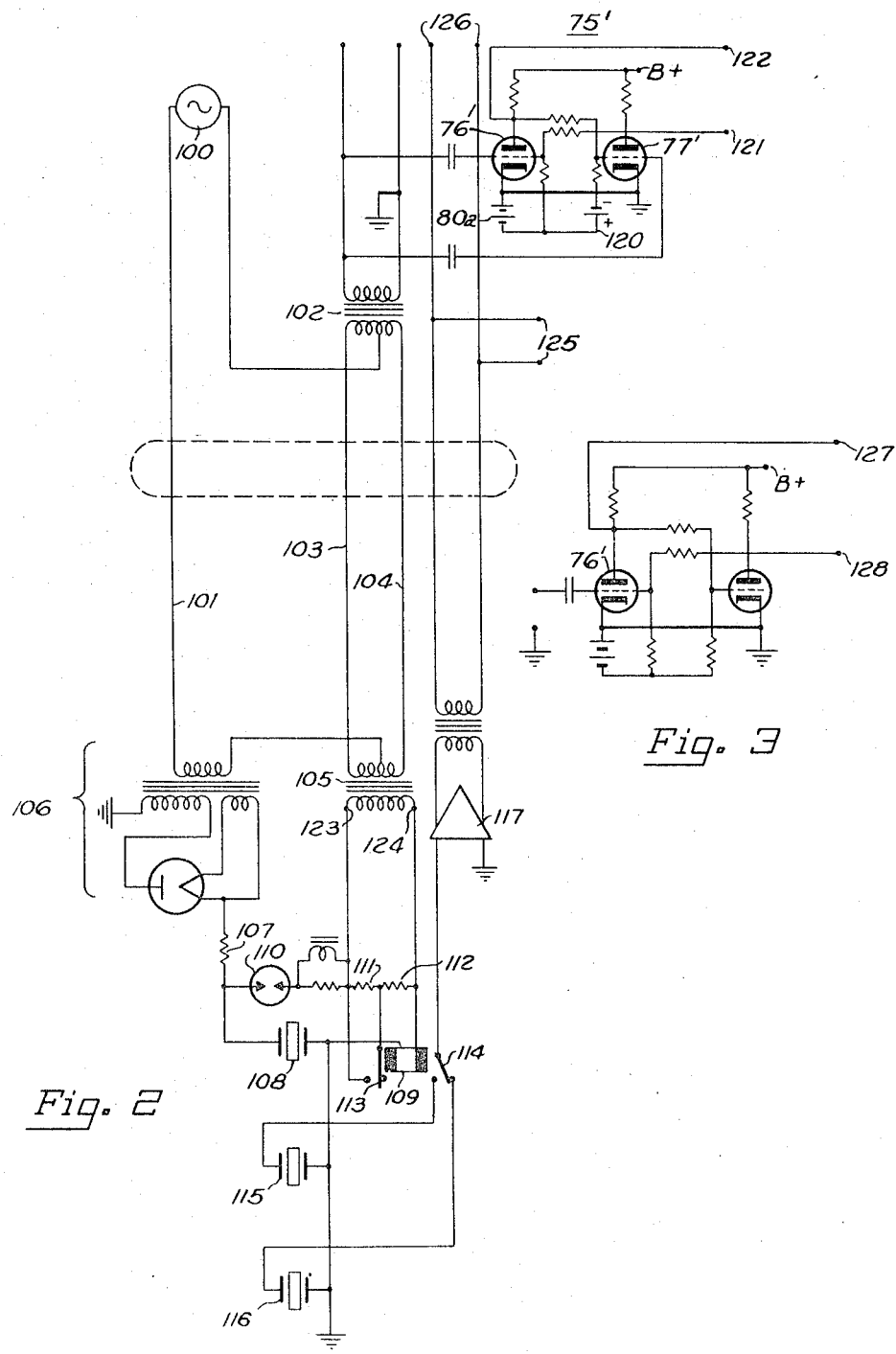
FIG. 2 is a modification of the invention.
FIG. 3 is a modified form of the multivibrator circuit for utilizing distinctive time markers.

A modified system is illustrated in FIG. 2. An alternating current source 100 is connected by way of conductor 101 and through transformer 102, conductors 103 and 104 and transformer 105 to a rectifier 106 positioned in the borehole. Rectifier 106 is connected through resistor 107 to the acoustic signal source or crystal 108, which in turn is connected to ground. When the charge on the crystal reaches a certain magnitude, discharge tube 110 breaks down to discharge crystal 108. The discharge current flowing through resistors 111 and 112 and the relay coil 109 actuates the stepping switch armatures 113 and 114. Armature 114 serves alternately to connect detectors 115 and 116 to the borehole amplifier 117 in the same manner as above described in connection with FIG.

1. On alternate discharges of crystal 108, armature 113 shunts resistor 111. If resistors 111 and 112 are of equal value, the timing marker applied to transformer 105 and transmitted uphole to transformer 102 will alternately be of different amplitudes, bearing a relation one to another of one to one-half.

The control system 75', corresponding with control system 75 of FIG. 1, is responsive to such distinctive markers so that tubes 76' or 77' no longer operate from an initial random condition, but rather are keyed to and synchronized with the relay 109. More particularly, a battery 120 is connected in the grid circuit of tube 77' and its level adjusted together with the level of battery 80a so that it will not respond to timing markers of one-half amplitude.

The output voltages from the control network 75' appearing at terminals 121 and 122 will thus be applied to sensing systems of the type above discussed which will be connected to terminals 125 and 126. Thus, regardless of the tendency of tubes 76' and 77' to lock into operation at random, the circuit operation at least after the first pulse from crystal 108 is keyed to relay 109.

FIG. 3 illustrates an alternative arrangement. The timing markers may be characterized by reversal in polarity on alternate cycles rather than the variation in amplitude discussed above. This may be accomplished by reversing the circuit connections at terminals 123 and 124 of the transformer 105, FIG. 2, under the control of relay 109. A double throw, double pole switch operated by a relay coil would be suitable. When markers of reversing polarity are utilized, the markers are applied only to the grid of tube 76', FIG. 3, since the positive pulse will turn tube 76' on and the negative pulse will turn tube 76' off. In this manner, output voltages at terminals 127 and 128 are in a different manner keyed to switching operation downhole.

Figure 4:
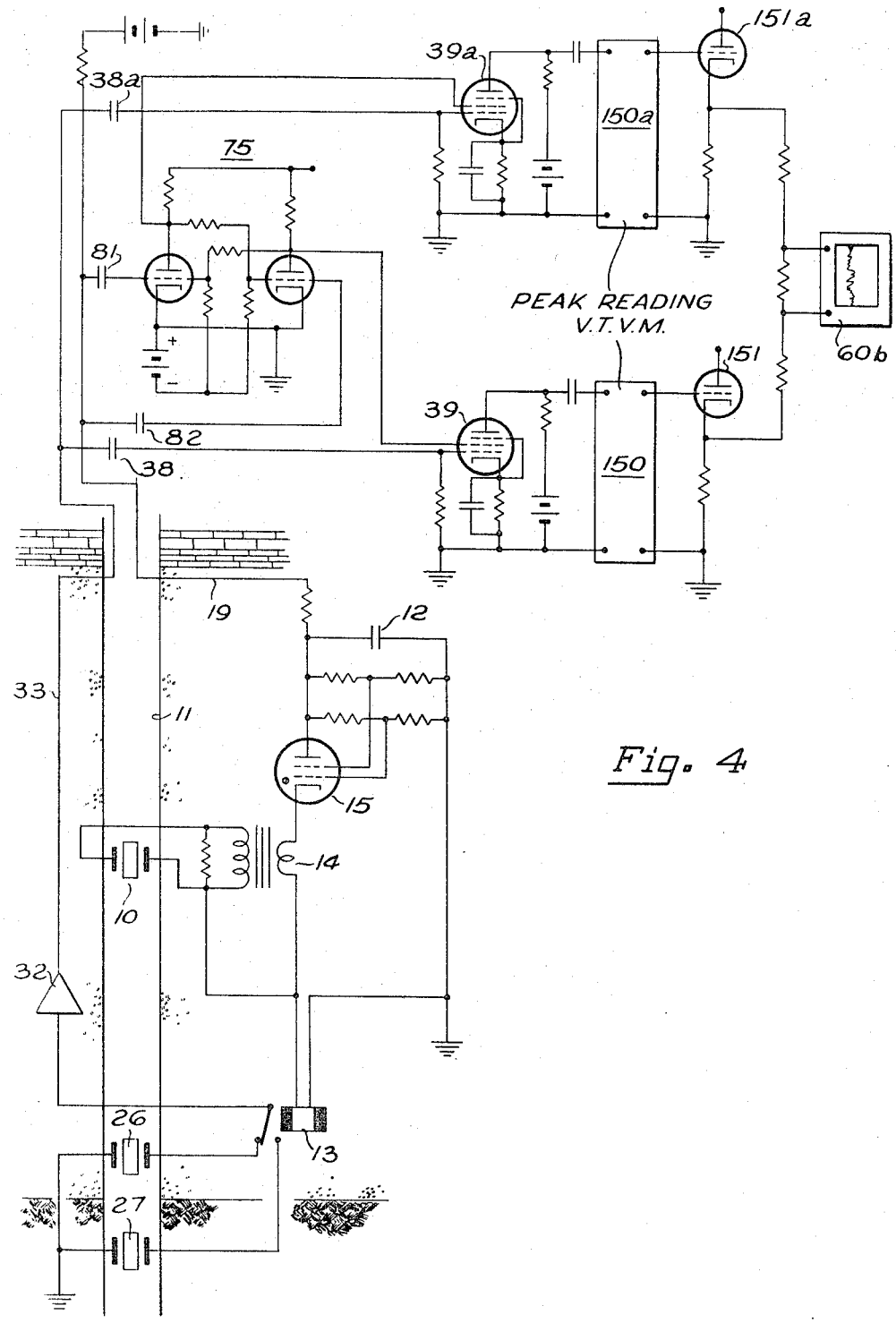
FIG. 4 illustrates a modification of the invention.

The foregoing description has related specifically to acoustic velocity well logging systems. Now, there will be described a system in which the attenuation properties of the earth formations are measured. In accordance with the embodiment of the invention illustrated in FIG. 4, two output voltages are provided for more accurately indicating the attenuation properties than is possible with prior art systems. Where consistent, like parts have been given the same reference characters as in FIG. 1.

The separation between the crystal or transducer 10 and the detectors 26 and 27 is made relatively large compared to the spacing between detectors 26 and 27. Condenser 12, discharging through relay coil 13, transformer primary 14 and tube 15, produces acoustic pulses in the formations adjacent the borehole 11 for travel to the detectors. In response to repeated cycles of discharge of condenser 12, detectors 26 and 27 are connected on alternate cycles to the input of amplifier 32. Signals are transmitted uphole by way of channel 33 and are applied through condensers 38 and 38a to the control grids of amplifying tubes 39 and 39a. A marker pulse, generated coincident with generation of each of the pulses by the transducer 10, is transmitted uphole by way of conductor 19 and applied by way of condensers 81 and 82 to the bistable multivibrator 75. Multivibrator 75 serves to produce gating voltages for application to the screen grids of the amplifier tubes 39 and 39a. The output of amplifier 39 is connected to a peak reading vacuum tube voltmeter 150. The output voltage of the vacuum tube voltmeter 150 is sensed by the cathode follower stage 151. In a similar manner the signal from amplifier tube 39a is applied to a similar vacuum tube voltmeter 150a whose output is sensed by a cathode follower stage 151a.

In operation, assume that initially the multivibrator 75 has tube 39 turned on and the tube 39a turned off. The pulse detected by detector 26 will then produce in the voltmeter 150 a voltage proportional to the maximum acoustic signal amplitude of energy traveling through the various possible paths from the transducer 10 to the near detector 26. On the next cycle of operations, tube 39a is turned on and tube 39 is turned off, so that the detected signal from detector 27 produces in the voltmeter 150a a voltage proportional to the maximum amplitude of an acoustic signal traveling from the transducer 10 to the far detector 27. If the distance between transducer 10 and the near detector 26 is large compared to the distance between detectors 26 and 27, the difference in the voltages produced in the voltmeters 150 and 150a will be more nearly a direct measure of the attenuation of the formations than will be obtained using a single transducer and detector.

The voltages sensed by cathode followers 151 and 151a are recorded by recorder 60b in the same manner as illustrated in the system of FIG. 1. Of course, the individual voltages for actuation of recorders, such as recorders 60 and 60a of FIG. 1, are available in the system of FIG. 4, if recordation thereof is desired.

It will be seen that within the provisions of the present invention, periodically recurring acoustic pulses are detected at two points in the borehole, and the signals generated upon detection are transmitted on alternate cycles to the earth's surface. Timing markers produced coincident with the generation of the acoustic pulses are utilized at the surface for selectively actuating the surface sensing systems to produce a pair of output voltages which may be utilized in the production of useful acoustic logs.

While in FIG. 1 three recorders have been shown, it will be apparent that all traces may be recorded in a single recording unit or that a selected pair of the three traces may be produced. Further, the relay system illustrated for switching detector channels at the downhole location is merely exemplary of the types of systems that are suitable for this operation. For example, a circuit downhole similar in construction and operation to the multivibrator 75 and amplifying tubes 39 and 39a would be suitable for applying signals from detectors 26 and 27 alternately to the uphole signal channel 33. However, the relay operated system is preferred because of its simplicity and minimum power requirement.

While the invention has been illustrated and described by several modifications thereof, it will be apparent that further modifications will now suggest themselves to those skilled in the art, and it is intended to cover such modifications as fall within the scope of the appended claims.

What is claimed is:

1. A borehole logging system having a transmitter and two receivers for measuring in correlation with depth the attenuation properties of the formations adjacent said borehole through a distance equal to the spacing between said receivers comprising:

downhole means movable lengthwise of said borehole and including said two receivers and a transmitter spaced from said two receivers a distance which is large compared with the spacing between said two receivers, means for periodically energizing said transmitter for the production of a succession of acoustic pulses for travel through said formations along said borehole, cable-conductor means connected to said receivers and extending to the surface for transmittal thereto of signals produced by said receivers in response to the acoustic pulses traveling through said formations from said transmitter to first one and then the other of said receivers, electrical circuit means located at said surface and connected to said cable-conductor means for producing outputs respectively proportional to the signal amplitude developed first by one and then the other of said receivers as a result of said acoustic pulses generated by said transmitter, selective means disposed between said two receivers and said electrical circuit means for applying thereto the signals developed by one of said receivers in response to one of said acoustic pulses and thereafter for applying to said electrical circuit means the signals from a second of said receivers in response to a second of said transmitter pulses, and difference means for producing an output signal representative of the difference between said amplitudes of said signals developed first by one of said receivers and then by a second of said receivers as a measure of the attenuation of said acoustic pulses during their travel through the separation distance between said receivers, the large spacing between said transmitter and said two receivers enhancing the accuracy of the measurement of said attenuation.

2. An acoustic amplitude logging system comprising:

downhole means having a plurality of transducers including a transmitter of time-spaced acoustic pulses and at least two receivers, sync means for generating sync pulses representative of the time occurrence of the generation of acoustic pulses by said transmitter, circuit means connecting said transducers to surface equipment, said surface equipment including amplitude sensing means for producing separate amplitude functions representative of the amplitudes of acoustic energy appearing at said receivers, a bistable circuit, said sync pulses being applied to said bistable circuit to switch it between stable states in response to each sync pulse, gating means connected between said receivers and said amplitude sensing means, the output of said bistable circuit being applied to said gating means to enable it to pass the output of a first of said receivers after a first and succeeding alternate sync pulses and to pass the output of a second of said receivers after a second and succeeding alternate sync pulses so that said amplitude sensing means produces a first of said amplitude functions representative of the amplitude of at least a portion of a first acoustic pulse after travel along the formations between said transmitter and a first of said receivers, and a second of said amplitude functions representative of the amplitude of at least a portion of a second acoustic pulse after travel along said formations between said transmitter and a second of said receivers, and means for producing from said separate amplitude functions a signal representative of the attenuation of acoustic energy between said two receivers.

3. An acoustic amplitude logging system comprising:

downhole means having a plurality of transducers including a transmitter for generating acoustic pulses and at least first and second receivers spaced from the transmitter and spaced one from the other for detecting said pulses after their travel through the formations along a borehole and for producing first and second receiver signals, circuit means connecting said transducers to surface equipment, said surface equipment including amplitude sensing means coupled to said circuit means for producing signal amplitude functions, a first of said amplitude functions being representative of the amplitude of a first acoustic pulse after travel along said formations between said transmitter and said first receiver, a second of said amplitude functions being representative of the amplitude of a second acoustic pulse after travel along said formations between said transmitter and said second receiver, sync means for generating sync pulses representative of the time occurrence of the generation of acoustic pulses by said transmitter, said amplitude sensing means including uphole gating means responsive to said sync pulses for enabling said amplitude sensing means to generate only said first of said amplitude functions in response to a sync pulse representing the time occurrence of the generation of said first acoustic pulse and to generate only said second of said amplitude functions in response to a sync pulse representing the time of the generation of said second acoustic pulse, and difference means for producing the difference between said first and second amplitude functions to produce a signal representative of the attenuation of acoustic pulses along said formations between said first and second receivers.

4. An acoustic amplitude logging system comprising:

a transmitter for generating acoustic pulses for travel through formations along a borehole, a first receiver spaced from the transmitter for detecting said acoustic pulses after their travel through said formations and for producing a first receiver signal, a second receiver spaced from said first receiver by a distance which is less than the spacing between said transmitter and said first receiver, said second receiver producing a second receiver signal in response to acoustic pulses detected after their travel through said formations, circuit means for conducting said first receiver signal to the surface of the earth only after production of a first acoustic pulse by said transmitter and for conducting said second receiver signal to the surface of the earth only after production of a second acoustic pulse by said transmitter, a first amplitude sensing means connected to said circuit means at the surface of the earth, said first amplitude sensing means being responsive only to said first receiver signal for producing a first voltage proportional to the amplitude of at least a portion of said first acoustic pulse after travel through the formations along said borehole, a second amplitude sensing menas connected to said circuit means at the surface of the earth, said second amplitude sensing means being responsive only to at least a portion of said second receiver signal for producing a second voltage proportional to the amplitude of said second acoustic pulse after travel through the formations along said borehole, and difference means for producing the difference between said first and second voltages to produce a signal representative of the attenuation of acoustic pulses along the formations between said first and second receivers.

5. The system recited in claim 4 and means for recording said signal representative of the attenuation of acoustic pulses as a function of the depth of said receivers in the borehole.

6. An acoustic amplitude logging system comprising:

a transmitter for generating time-spaced acoustic pulses for travel through formations along a borehole, a first receiver spaced from the transmitter for detecting said acoustic pulses after their travel through said formations for producing a first receiver signal having an amplitude representing the amplitude of the detected acoustic pulses, a second receiver spaced from said first receiver by a distance which is less than the spacing between said transmitter and said first receiver, said second receiver detecting acoustic pulses after their travel through said formations for producing a second receiver signal having an amplitude representing the amplitude of the detected acoustic pulses, sync means for generating sync pulses representative of the time occurrence of the generating of said acoustic pulses of said transmitter, circuit means for conducting said first receiver signal to the surface of the earth only after production of a first and succeeding alternate acoustic pulses by said transmitter and for conducting said second receiver signal to the surface of the earth only after production of a second and succeeding alternate acoustic pulses by said transmitter, first amplitude sensing means for producing a first voltage proportional to the amplitude of at least a portion of said first receiver signal, second amplitude sensing means for producing a second voltage proportional to the amplitude of at least a portion of said second receiver signal, a bistable circuit, said sync pulses being applied to said bistable circuit to switch it between stable states in response to each sync pulse, a first uphole gating circuit connected between said first receiver and said first amplitude sensing means, the output of said bistable circuit being applied to said first gating circuit to enable it to pass said first receiver signal to said first amplitude sensing means after a first and succeeding alternate sync pulses, a second uphole gating circuit connected between said second receiver and said second amplitude sensing means, the output of said bistable circuit being applied to said second gating circuit to enable it to pass said second receiver signal to said second amplitude sensing means after a second and succeeding alternate sync pulses, and difference means for producing the difference between said first and second voltages to produce a signal representative of the attenuation of acoustic pulses along the formations between said first and second receivers.

References Cited by the Examiner
UNITED STATES PATENTS

| | | | |
|---|---|---|---|
| 2,191,120 | 2/1940 | Slichter | 181—.5 |
| 2,200,476 | 5/1940 | Mounce | 181—.5 |
| 2,233,992 | 3/1941 | Wyckoff | 340—18 |
| 2,813,590 | 11/1957 | McDonald | 181—.5 |
| 3,182,285 | 5/1965 | Vogel | 340—18 |

BENJAMIN A. BORCHELT, *Primary Examiner.*

R. M. SKOLNIK, *Assistant Examiner.*